US009480012B2

(12) United States Patent
Wang et al.

(10) Patent No.: US 9,480,012 B2
(45) Date of Patent: Oct. 25, 2016

(54) METHOD AND DEVICE FOR MEASUREMENT COMPENSATION FOR INTER-SYSTEM RESELECTION AND HANDOVER IN DUAL-MODE TERMINAL

(75) Inventors: Shengbin Wang, Huizhou (CN); Xia Hu, Huizhou (CN); Ling Ma, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 174 days.

(21) Appl. No.: 13/979,112

(22) PCT Filed: Feb. 16, 2012

(86) PCT No.: PCT/CN2012/071235
§ 371 (c)(1),
(2), (4) Date: Jul. 10, 2013

(87) PCT Pub. No.: WO2012/109995
PCT Pub. Date: Aug. 23, 2012

(65) Prior Publication Data
US 2013/0301464 A1   Nov. 14, 2013

(30) Foreign Application Priority Data
Feb. 17, 2011   (CN) .......................... 2011 1 0039767

(51) Int. Cl.
*H04W 48/18* (2009.01)
*H04W 24/10* (2009.01)
(52) U.S. Cl.
CPC ............. *H04W 48/18* (2013.01); *H04W 24/10* (2013.01)
(58) Field of Classification Search
None
See application file for complete search history.

(56) References Cited

U.S. PATENT DOCUMENTS

| 6,978,138 | B2 * | 12/2005 | Japenga et al. ............... 455/436 |
| 7,535,846 | B2 * | 5/2009 | Kim et al. ...................... 370/241 |
| 7,970,399 | B2 * | 6/2011 | Sunderberg et al. ......... 455/436 |
| 8,798,666 | B2 * | 8/2014 | Catovic et al. ............... 455/525 |

(Continued)

FOREIGN PATENT DOCUMENTS

| CN | 1981458 | 6/2007 |
| CN | 101207911 | 6/2008 |

(Continued)

OTHER PUBLICATIONS

International Search Report for PCT/CN2012/071235 dated May 24, 2012.

*Primary Examiner* — Jeffrey M Rutkowski
*Assistant Examiner* — Andre Tacdiran
(74) *Attorney, Agent, or Firm* — Hauptman Ham, LLP

(57) ABSTRACT

Method and device for measurement compensation for inter-system reselection and handover in a dual-mode terminal are disclosed. The method comprises: a GSM physical layer reporting measured RSCP and Ec/No values of a 3G neighbor cell to a radio resource management layer with inter-layer primitives; the radio resource management layer receiving the inter-layer primitives carrying the RSCP and Ec/No values reported by the physical layer, and performing measurement compensation for the inter-layer primitives in the radio resource management layer. Since the measurement compensation is performed in the radio resource management layer of the terminal, the terminal preferably resides on 3G network when detecting the 3G network. It can be applied to measurement compensation for the inter-system reselection and handover when 2G and 3G mobile communication systems co-exist. The terminal is more easily retained on the network of one of the systems and allowed to make a priority selection of the networks.

3 Claims, 3 Drawing Sheets

(56) References Cited

U.S. PATENT DOCUMENTS

| | | | |
|---|---|---|---|
| 2003/0218995 A1* | 11/2003 | Kim | H04W 36/0066 370/318 |
| 2008/0014941 A1* | 1/2008 | Catovic et al. | 455/436 |
| 2008/0233955 A1* | 9/2008 | Narang et al. | 455/434 |
| 2009/0274086 A1* | 11/2009 | Petrovic | H04J 11/0093 370/312 |
| 2010/0056178 A1* | 3/2010 | Kreher | G01S 5/0252 455/456.1 |
| 2010/0120429 A1* | 5/2010 | Kazmi | H04W 36/30 455/436 |
| 2011/0117911 A1* | 5/2011 | Narang et al. | 455/434 |
| 2012/0014258 A1* | 1/2012 | Chin et al. | 370/241 |
| 2012/0069758 A1 | 3/2012 | Kim et al. | |

FOREIGN PATENT DOCUMENTS

| | | |
|---|---|---|
| CN | 101472357 | 7/2009 |
| CN | 101562820 | 10/2009 |
| CN | 101820658 | 9/2010 |
| CN | 101909344 | 12/2010 |
| CN | 102076013 | 5/2011 |
| WO | 2007086679 | 8/2007 |

* cited by examiner

METHOD AND DEVICE FOR MEASUREMENT COMPENSATION FOR INTER-SYSTEM RESELECTION AND HANDOVER IN DUAL-MODE TERMINAL

CROSS REFERENCE TO RELATED APPLICATION

This application claims the priority of Chinese Patent Application No. 201110039767.1, filed on Feb. 17, 2011 in the SIPO (State Intellectual Property Office of the P.R.C.). Further, this application is the National Phase application of International Application No. PCT/CN2012/071235 filed on Feb. 16, 2012, which designates the United States.

FIELD OF THE INVENTION

The present invention relates to a wireless communication technology, more particularly, to a method and device for measurement compensation for inter-system reselection and handover in a dual-mode terminal.

BACKGROUND OF THE INVENTION

The now-existing inter-system handover and reselection in a 2/3G dual-mode terminal is realized by the network controlling the threshold and the terminal reporting the level of measured signal. Different parameters are set up at the network terminal by telecommunications operators based on their individual requirements to control the operation of the terminal. However, nowadays in a highly competitive market, some of the operators only run 3G networks, while some others only run 2G networks. The networks are communicated by internet protocol. According to the current solution, the handover of the terminal is controlled by the network terminal. For those operators who rent networks from other operators, it's impossible for them to take part in the set up of the network parameters set up by the provider. At the same time, they wish to retain the terminal on their network to the greatest extent to reduce cost.

The current 2G-3G cell reselection method is realized by the network issuing a 3G neighbor cell list to the mobile terminal through system messages such as 2quarter/2ter or 5quarter/5ter when the 2G cell has a 3G neighbor cell. The terminal reports the level and quality of the 3G neighbor cell through a measurement report. The system message 2quarter/2ter is the supplement to the system messages 2, and the 3G neighbor cell list is issued through 2quarter/2ter. The criteria for 2G-3G inter-system reselection are:

1). The measured received signal code power (RSCP) of the 3G neighbor cell is greater than the power level strength of the serving cell and the received levels of all other non-serving cells by the frequency division duplex cell reselection offset (FDD_Qoffset, which denotes the inter-system cell reselection offset). That is, RSCP (Received Signal Code Power)>RLA (Received Level Average, the average received level of the cell)+FDD_Qoffset (inter-system cell reselection offset), where the cell reselection offset is a parameter broadcast by the network.

2). The measured Ec/No of the 3G neighbor cell (Ec/No=RSCP/RSSI, that is the received signal code power received from the cell unit dBm/the total power received at the point (including the cell) unit dBm)≥FDD_Qmin (the minimum threshold value for Ec/No for inter-system cell reselection) and RSCP≥FDD_RSCP_threshold (the minimum threshold value for RSCP for inter-system cell reselection).

3). The above-mentioned criteria must be satisfied and last for 5 seconds.

In the above-mentioned criteria, except for the RSCP and the Ec/No of the 3G neighbor cell measured by the terminal, all other parameters are controlled by the network. The 2G-3G handover operates similarly.

According to the prior art, the development of GSM network is more mature and the GSM network coverage is very vast. Since some of the operators only run 3G networks, they wish that the terminal preferentially resides on the 3G networks to the greatest extent when GSM network and 3G network co-exist. However, because they do not own 2G networks, they cannot set up the network to optimize the network so that the terminal is not allowed to make a priority selection of the networks.

It is therefore very important to make improvement and development on the prior art.

SUMMARY OF THE INVENTION

The present invention provides a method and a device for measurement compensation for inter-system reselection and handover in a dual-mode terminal to allow the terminal to make a priority selection of the networks by performing measurement compensation in the terminal.

The present invention provides a method for measurement compensation for inter-system reselection and handover in a dual-mode terminal. The method comprises the steps of:

A. a GSM physical layer reporting measured RSCP and Ec/No values of a 3G neighbor cell to a radio resource management layer with inter-layer primitives;

B. the radio resource management layer receiving the inter-layer primitives carrying the RSCP and Ec/No values reported by the physical layer, and performing measurement compensation for the inter-layer primitives in the radio resource management layer to form a new measurement report; and C. the radio resource management layer reporting the measurement report to a network.

In one aspect of the present invention, the following steps before the step A: a. adding three NV items to non-volatile random access memory of the terminal, the first NV item being a compensation switch item used for determining whether to perform measurement compensation, the second NV item being a level compensation item for the 3G neighbor cell, and the third NV item being a Ec/No compensation item for the 3G neighbor cell.

In another aspect of the present invention, the step A comprises: the GSM physical layer measuring signal qualities of the 3G neighbor cell and reporting the measured RSCP and Ec/No values of the 3G neighbor cell to the radio resource management layer with the inter-layer primitives.

In another aspect of the present invention, step B further comprises: the measurement compensation for RSCP being performed in the radio resource management layer when the handover being based on RSCP, and the measurement compensation for Ec/No being performed in radio resource management layer when the handover being based on Ec/No.

In another aspect of the present invention, the step B comprises:

B1. the radio resource management layer receiving the inter-layer primitives carrying the RSCP and Ec/No values reported by the physical layer to determine whether to perform measurement compensation, then going to Step B2;

B2. determining whether the compensation switch being turned on and whether the level compensation for the 3G neighbor cell being not null, If yes, going to Step B3, If not, going to Step B4;

B3. forming the new measurement report when the compensation switch being turned on and the level compensation for the 3G neighbor cell being not null, the reported RSCP of the 3G neighbor cell=the actually measured RSCP+the level compensation for the 3G neighbor cell multiplied by 1 db;

B4. determining whether the compensation switch being turned on and whether the Ec/No compensation for the 3G neighbor cell being not null; If yes, going to Step B5. If not, going to Step C; and B5. forming the new measurement report when the compensation switch being turned on and the Ec/No compensation for the 3G neighbor cell being not null, the reported Ec/No of the 3G neighbor cell=the actually measured Ec/No+the Ec/No compensation for the 3G neighbor cell multiplied by 1 db.

The present invention further provides a device for measurement compensation for inter-system reselection and handover in a dual-mode terminal. The device comprises a GSM physical layer module, a radio resource management layer measurement compensation module, and a measurement report reporting module. The GSM physical layer module is used for measuring signal qualities of a 3G neighbor cell by a GSM physical layer, and reporting measured RSCP and Ec/No values of the 3G neighbor cell to a radio resource management layer with inter-layer primitives. The radio resource management layer measurement compensation module is used for receiving the inter-layer primitives carrying the RSCP and Ec/No values reported by the physical layer, and performing measurement compensation for the inter-layer primitives in the radio resource management layer to form a new measurement report. The measurement report reporting module is used for reporting the measurement report to a network.

In one aspect of the present invention, an addition module is used for adding three NV items to non-volatile random access memory of the terminal. The first NV item is a compensation switch item for determining whether to perform measurement compensation the second NV item is a level compensation item for the 3G neighbor cell. The third NV item is a Ec/No compensation item for the 3G neighbor cell.

In another aspect of the present invention, the radio resource management layer measurement compensation module comprises a first sub measurement compensation module for performing measurement compensation for RSCP in the radio resource management layer when the handover being based on RSCP, and a second sub measurement compensation module for performing measurement compensation for Ec/No in the radio resource management layer when the handover being based on Ec/No.

In another aspect of the present invention, the radio resource management layer measurement compensation module further comprises a receiver unit for receiving the inter-layer primitives carrying the RSCP and Ec/No values reported by the physical layer to determine whether to perform measurement compensation, a first judging unit for determining whether the compensation switch being turned on and whether the level compensation for the 3G neighbor cell being not null; and a first measurement report forming unit for forming the new measurement report when the compensation switch being turned on and the level compensation for the 3G neighbor cell being not null, the reported RSCP of the 3G neighbor cell=the actually measured RSCP+the level compensation for the 3G neighbor cell multiplied by 1 db.

In another aspect of the present invention, the radio resource management layer measurement compensation module further comprises a second judging unit used for determining whether the compensation switch being turned on and whether the Ec/No compensation for the 3G neighbor cell being not null; and a second measurement report forming unit for forming the new measurement report when the compensation switch being turned on and the Ec/No compensation for the 3G neighbor cell being not null, the reported Ec/No of the 3G neighbor cell=the actually measured Ec/No+the Ec/No compensation for the 3G neighbor cell multiplied by 1 db.

The device for measurement compensation for inter-system reselection and handover in a dual-mode terminal further comprises an addition module. The addition module is used for adding three NV items to non-volatile random access memory of the terminal. The first NV item is a compensation switch item used for determining whether to perform measurement compensation. The second NV item is a level compensation item for the 3G neighbor cell. The third NV item is a Ec/No compensation item for the 3G neighbor cell.

In contrast to the prior art, the present invention provides a method and device for measurement compensation for inter-system reselection and handover in a dual-mode terminal. Since the measurement compensation is performed in the radio resource management layer of the terminal, the terminal will preferably reside on the 3G network when it detects the 3G network. It can be applied to the measurement compensation for the inter-system reselection and handover when 2G mobile communication system and 3G mobile communication system co-exist. As a result, the terminal is more easily retained on the network of one of the systems and is allowed to make a priority selection of the networks.

DETAILED DESCRIPTION OF THE PREFERRED EMBODIMENTS

The present invention provides a method and a device for measurement compensation for inter-system reselection and handover in a dual-mode terminal. The present invention method is realized by measurement compensation in the radio resource management layer of the terminal to achieve the inter-system reselection and handover. In order to make objectives, solutions and advantages of the present invention more clear and definite, embodiments of the present invention will be further described in detail with reference to the appended drawings. It should be understood that the embodiments are described only for explaining the present invention rather than limiting the present invention.

The 2G-3G inter-system reselection and handover relies on the RSCP and Ec/No of the 3G neighbor cell reported by the terminal. RSCP (received signal code power) is the signal level quality of the cell measured by the terminal Ec/No (Ec/No=RSCP/RSSI, that is the received signal code power received from the cell unit dBm/the total power received at the point (including the cell) unit dBm) is the signal ratio of the cell measured by the terminal. The operators may set up whether the handover is to be based on RSCP or Ec/No. When the handover is based on RSCP, measurement compensation for RSCP is performed in radio resource management layer. When the handover is based on Ec/No, measurement compensation for Ec/No is performed in radio resource management layer. The present invention thus implants individual compensation under each of the two situations.

Figure 1:
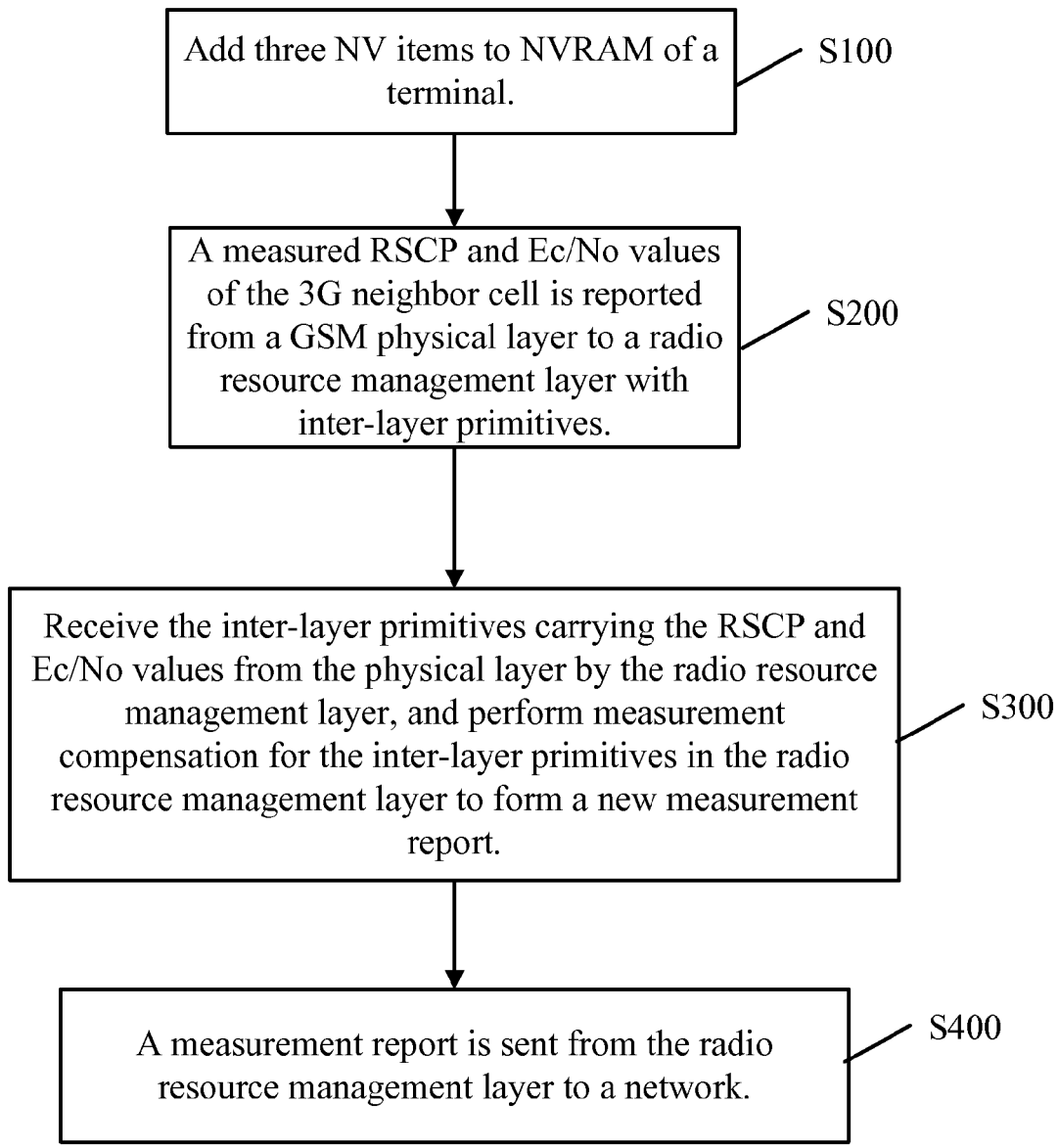
FIG. 1 is a flow chart of a method for measurement compensation for inter-system reselection and handover in a dual-mode terminal according to an embodiment of the present invention.

As shown in FIG. 1, the present invention provides a method for measurement compensation for inter-system reselection and handover in a dual-mode terminal, which comprises the following main steps:

Step S100: add three NV items (similar to pointer address) to non-volatile random access memory (NVRAM) of the terminal. The three NV items are as follows:

The first NV item is a compensation switch used for determining whether to perform measurement compensation. For example: if the first NV item is added, then the compensation switch is turned on when the value is taken as 1 and turned off when the value is taken as 0.

The second NV item, being a level compensation for a 3G neighbor cell, ranges from −63 to +64 and has a step of 1 db. Since there are a total of 128 values, they are represented by a hexadecimal byte. The value of the NV item is taken as 0~127, which are compatible with the data type of the NVRAM.

The signal received by the terminal usually ranges from −70 db to −110 db. Hence, a more even compensation step is selected because a step smaller than 1 will involve a floating point operation or a division operation to reduce code efficiency. −63 is corresponding to the value of the NV item when it is taken as 0.64 is corresponding to the value of the NV item when it is taken as 127. Since the compensation ranges from −63 to +64 and the value of the NV item is defined as 0~127, −63 is taken as 0 and +64 is taken as 127.

The third NV value, being a Ec/No compensation for the 3G neighbor cell, ranges from −63 to +64 and has a step of 1 db.

Step S200: A measured RSCP and Ec/No values of the 3G neighbor cell is reported from a GSM physical layer to a radio resource management layer with inter-layer primitives. For example: the GSM physical layer measures signal qualities of the 3G neighbor cell and reports the measurement results of the 3G neighbor cell to the radio resource management layer with inter-layer primitives. That is, the GSM physical layer uses inter-layer primitives to report the measured RSCP and Ec/No values of the 3G neighbor cell to the radio resource management layer.

Figure 2:
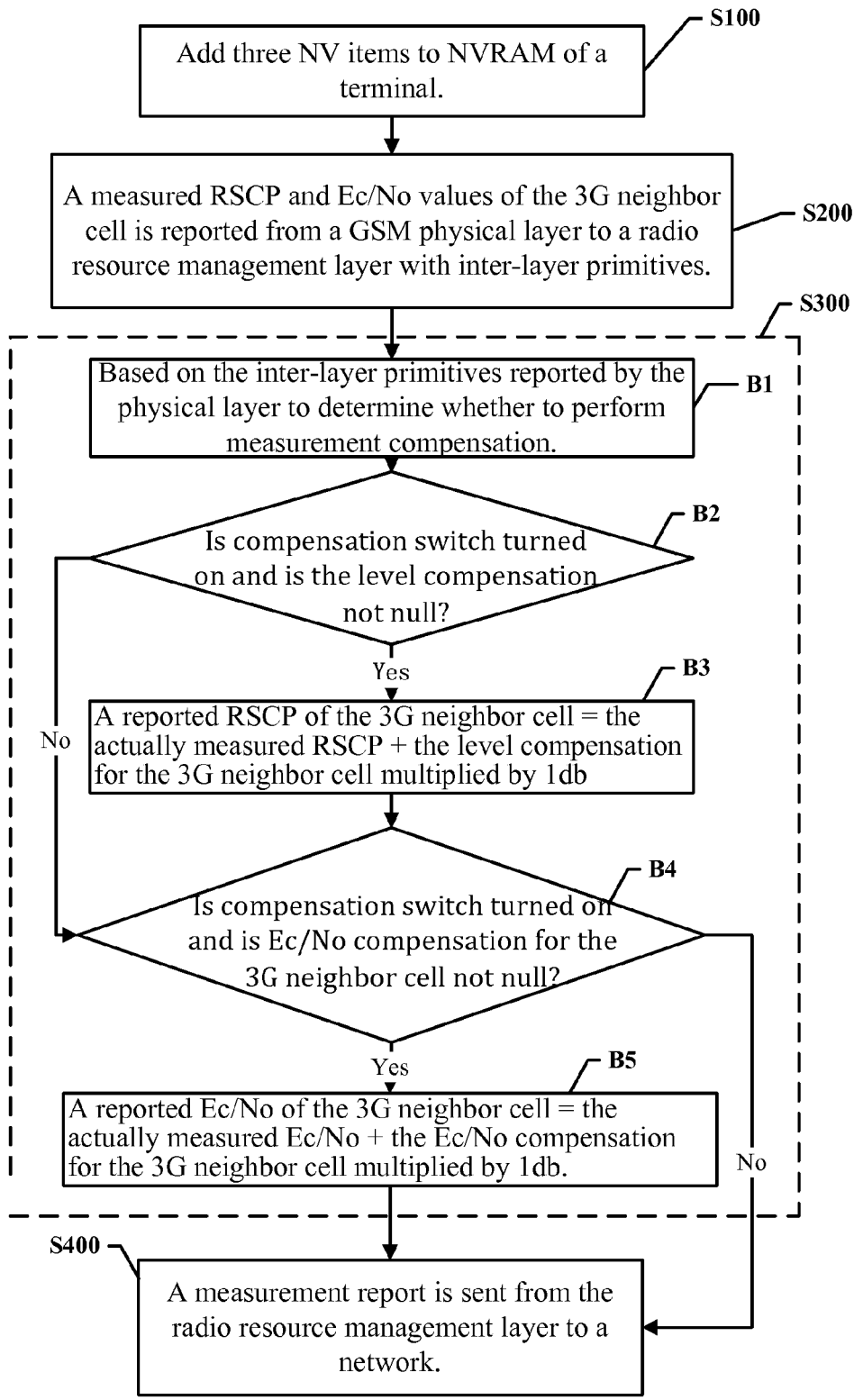
FIG. 2 is a detailed flow chart of a method for measurement compensation for inter-system reselection and handover in a dual-mode terminal according to an embodiment of the present invention.

Step S300: Receive the inter-layer primitives carrying the RSCP and Ec/No values from the physical layer by the radio resource management layer, and perform measurement compensation for the inter-layer primitives in the radio resource management layer to form a new measurement report. The present invention performs measurement compensation for the inter-layer primitives in the radio resource management layer. As shown in FIG. 2, Step 300 specifically comprises:

B1: the radio resource management layer receives the inter-layer primitives carrying the RSCP and Ec/No values reported by the physical layer to determine whether to perform measurement compensation. Then go to Step B2;

B2: determine whether the compensation switch is turned on and whether the level compensation for the 3G neighbor cell is not null. If yes, go to Step B3. If not, go to Step B4;

B3: form the new measurement report when the compensation switch is turned on and the level compensation for the 3G neighbor cell is not null. In the new report, the reported RSCP of the 3G neighbor cell=the actually measured RSCP+the level compensation for the 3G neighbor cell multiplied by 1 db;

B4: determine whether the compensation switch is turned on and whether the Ec/No compensation for the 3G neighbor cell is not null. If yes, go to Step B5. If not, go to Step 400;

B5: form the new measurement report when the compensation switch is turned on and the Ec/No compensation for the 3G neighbor cell is not null. In the new report, the reported Ec/No of the 3G neighbor cell=the actually measured Ec/No+the Ec/No compensation for the 3G neighbor cell multiplied by 1 db.

Technically, Step B2 and Step B4 are in parallel. However, according to the present invention, they are dependent when realizing. Step B2 and Step B4 are individual judgment branches and do not involve real compensating operations. The real compensation operations are performed in Step B3 and Step B5. RSCP and Ec/No are independent of each other. Both of them may be compensated, or one of them may be compensated.

That means, if the compensation switch is turned on and the level compensation for the 3G neighbor cell is not null, in the measurement report the reported RSCP of the 3G neighbor cell=the actually measured RSCP+the level compensation for the 3G neighbor cell multiplied by 1 db.

If the compensation switch is turned on and the Ec/No compensation for the 3G neighbor cell is not null, in the measurement report the reported Ec/No of the 3G neighbor cell=the actually measured Ec/No+the Ec/No compensation for the 3G neighbor cell multiplied by 1 db.

Step S400: A measurement report is sent from the radio resource management layer to a network. Operators may adjust the compensation parameters of the NV items based on their individual requirements and network situation to adapt to different application environments. For example, when the operator runs a 3G network and rents a 2G network, the rented network is set up such that the compensation parameters is 73 (since when the NV item value of 0 is taken the corresponding values is −63, the compensation of 10 db is correspondingly calculated as 10−(−63) and the value obtained is 73) to allow the handover to be performed when the 3G network signal quality outperforms the 2G network signal quality by 10 db. The reported level is the actual level+10 db. Under the circumstances, the handover is performed when the 3G signal has a better quality than the 2G signal.

Based on the above, it can be clearly seen that the method for measurement compensation for inter-system reselection and handover in a dual-mode terminal according to the embodiment of the present invention is achieved by performing measurement compensation in the radio resource management layer of the terminal. Hence, the terminal will preferably reside on the 3G network when it detects the 3G network. As a result, the terminal is allowed to make a priority selection of the networks.

Figure 3:
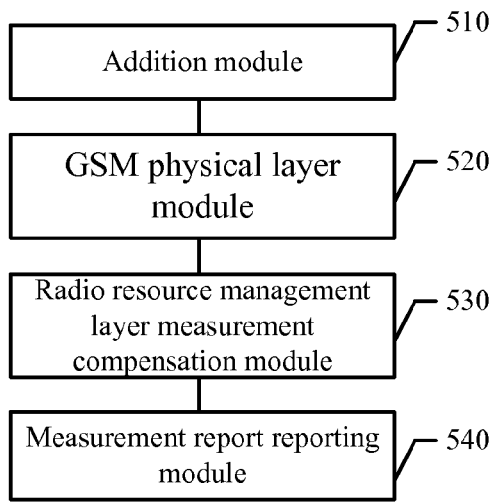
FIG. 3 is a functional block diagram of a device for measurement compensation for inter-system reselection and handover in a dual-mode terminal according to an embodiment of the present invention.

Based on the method for measurement compensation for inter-system reselection and handover in a dual-mode terminal according to the above-mentioned embodiment, a device for measurement compensation for inter-system reselection and handover in a dual-mode terminal is provided according to an embodiment of the present invention. As shown in FIG. 3, the device comprises:

an addition module 510 used for adding three NV items to NVRAM of the terminal. The first NV item is a compensation switch item used for determining whether to perform measurement compensation. The second NV item is a level compensation item for a 3G neighbor cell. The third NV item is a Ec/No compensation item for the 3G neighbor cell. They are specifically described as above.

a GSM physical layer module 520 used for measuring signal qualities of the 3G neighbor cell by a GSM physical layer, and reporting measured RSCP and Ec/No values of the 3G neighbor cell to a radio resource management layer with inter-layer primitives as specifically described above.

a radio resource management layer measurement compensation module 530 used for receiving the inter-layer primitives carrying the RSCP and Ec/No values reported by the physical layer, and performs measurement compensation for the inter-layer primitives in the radio resource management layer to form a new measurement report as specifically described above.

a measurement report reporting module 540 used for reporting the measurement report to a network as specifically described above.

Figure 4:
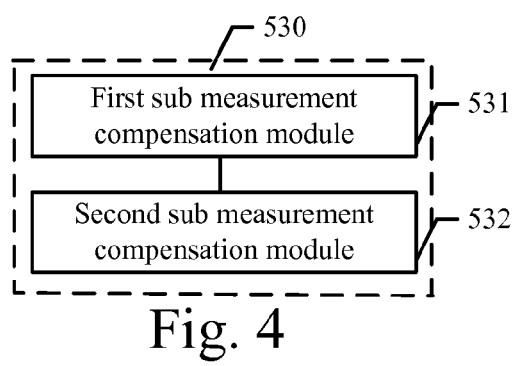
FIG. 4 is an internally functional block diagram of a radio resource management layer measurement compensation module according to an embodiment of the present invention.

As shown in FIG. 4, the radio resource management layer measurement compensation module 530 comprises:

a first sub measurement compensation module 531 used for performing measurement compensation for RSCP in the radio resource management layer when the handover is based on RSCP as specifically described above.

a second sub measurement compensation module 532 used for performing measurement compensation for Ec/No in the radio resource management layer when the handover is based on Ec/No as specifically described above.

Figure 5:
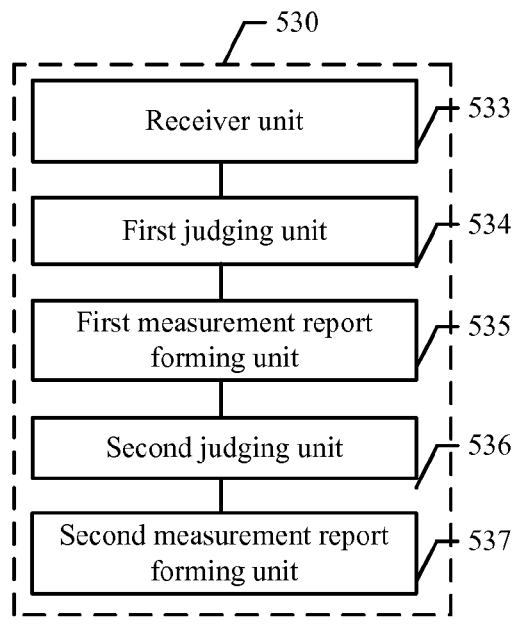
FIG. 5 is a detailed block diagram of internal function of the radio resource management layer measurement compensation module according to an embodiment of the present invention.

According to a further embodiment, as shown in FIG. 5, the radio resource management layer measurement compensation module 530 further comprises:

a receiver unit 533 used for receiving the inter-layer primitives carrying the RSCP and Ec/No values reported by the physical layer to determine whether to perform measurement compensation as specifically described above.

a first judging unit 534 used for determining whether the compensation switch is turned on and whether the level compensation for the 3G neighbor cell is not null as specifically described above.

a first measurement report forming unit 535 used for forming the new measurement report when the compensation switch is turned on and the level compensation for the 3G neighbor cell is not null. In the new measurement report, the reported RSCP of the 3G neighbor cell=the actually measured RSCP+the level compensation for the 3G neighbor cell multiplied by 1 db as specifically described above.

a second judging unit 536 used for determining whether the compensation switch is turned on and whether the Ec/No compensation for the 3G neighbor cell is not null as specifically described above.

a second measurement report forming unit 537 used for forming the new measurement report when the compensation switch is turned on and the Ec/No compensation for the 3G neighbor cell is not null. In the new measurement report, the reported Ec/No of the 3G neighbor cell=the actually measured Ec/No+the Ec/No compensation for the 3G neighbor cell multiplied by 1 db as specifically described above.

The receiver unit 533 is in parallel with the first sub measurement compensation module 531 and the second sub measurement compensation module 532. For example: when the first sub measurement compensation module 531 detects that the system sets up the handover being based on RSCP, the new measurement report is formed by the first judging unit 534 and the first measurement report forming unit 535 in the radio resource management layer. The reported RSCP of the 3G neighbor cell=the actually measured RSCP+the level compensation for the 3G neighbor cell multiplied by 1 db so as to perform measurement compensation for RSCP.

When the second sub measurement compensation module 532 detects that the system sets up the handover being based on Ec/Ro, the new measurement report is formed by the second judging unit 536 and the second measurement report forming unit 537 in the radio resource management layer. The reported Ec/No of the 3G neighbor cell=the actually measured Ec/No+the Ec/No compensation for the 3G neighbor cell multiplied by 1 db so as to perform measurement compensation for Ec/No.

In summary, the present invention provides a method and device for measurement compensation for inter-system reselection and handover in a dual-mode terminal. Since the measurement compensation is performed in the radio resource management layer of the terminal, the terminal will preferably reside on the 3G network when it detects the 3G network. It can be applied to the measurement compensation for the inter-system reselection and handover when 2G mobile communication system and 3G mobile communication system co-exist. As a result, the terminal is more easily retained on the network of one of the systems and is allowed to make a priority selection of the networks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for measurement compensation for inter-system reselection and handover in a dual-mode terminal, the method comprising the steps of:
   a. adding three non-volatile (NV) items to non-volatile random access memory of the terminal, wherein the three NV items comprise a first NV item being a compensation switch item to perform measurement compensation, a second NV item being a level compensation item for performing level compensation to a 3rd Generation (3G) neighbor cell, and a third NV item being an Energy on Chip/Noise Spectral Density (Ec/No) compensation item for performing the Ec/No compensation to the same 3G neighbor cell;
   A. a Global System for Mobile Communications (GSM) physical layer reporting measured Received Signal Code Power (RSCP) and Ec/No values of the 3G neighbor cell to a radio resource management layer with inter-layer primitives;
   B. the radio resource management layer receiving the inter-layer primitives carrying the RSCP and the Ec/No values reported by the GSM physical layer, and performing measurement compensation for the inter-layer primitives in the radio resource management layer to form a new measurement report; and C. the radio resource management layer reporting the measurement report to a network, wherein the step B comprises;

B1. the radio resource management layer receiving the inter-layer primitives carrying the RSCP and Ec/No values reported by the GSM physical layer to determine whether to perform the measurement compensation, B2. forming the new measurement report when the compensation switch is turned on and the level compensation for the 3G neighbor cell is not null, wherein, in the new measurement report, a reported RSCP value of the 3G neighbor cell is equal to a sum of (i) the RSCP value reported by the GSM physical layer and (ii) the level compensation for the 3G neighbor cell multiplied by Idb, and B3. forming the new measurement report when the compensation switch is turned on and the Ee/No compensation for the 3G neighbor cell is not null, wherein, in the new measurement report, a reported Ee/No value of the 3G neighbor cell is equal to a sum of (i) the Ee/No value reported by the GSM physical layer and (ii) the Ec/No compensation for the 3G neighbor cell multiplied by Idb.

2. The method of claim 1, wherein the step A comprises: the GSM physical layer measuring signal qualities of the 3G neighbor cell and reporting the measured RSCP and Ec/No values of the 3G neighbor cell to the radio resource management layer with the inter-layer primitives.

3. The method of claim 1, wherein the step B further comprises: the measurement compensation for RSCP being performed in the radio resource management layer when the handover is based on RSCP, and the measurement compensation for Ec/No being performed in the radio resource management layer when the handover is based on Ec/No.

* * * * *